(12) United States Patent
Lee

(10) Patent No.: US 7,922,144 B2
(45) Date of Patent: Apr. 12, 2011

(54) FIXTURE FOR DATA ACCESS DEVICE

(75) Inventor: Shu-Chin Lee, Zhonghe (TW)

(73) Assignee: Silverstone Technology Co., Ltd., Taipei County (TW)

( * ) Notice: Subject to any disclaimer, the term of this patent is extended or adjusted under 35 U.S.C. 154(b) by 425 days.

(21) Appl. No.: 12/244,107

(22) Filed: Oct. 2, 2008

(65) Prior Publication Data

US 2010/0085699 A1    Apr. 8, 2010

(51) Int. Cl.
*F16M 11/00*    (2006.01)

(52) U.S. Cl. ..................................... 248/694; 248/231.9

(58) Field of Classification Search .................. 248/694, 248/544, 27.1, 27.3, 205.1, 220.31, 221.11, 248/231.9; 361/679.31, 679.32

See application file for complete search history.

(56) References Cited

U.S. PATENT DOCUMENTS

| | | | |
|---|---|---|---|
| 6,266,250 B1 * | 7/2001 | Foye | 361/760 |
| 6,305,660 B1 * | 10/2001 | Liao | 248/694 |
| 7,543,786 B2 * | 6/2009 | Yang | 248/222.51 |
| 7,576,984 B2 * | 8/2009 | Chen et al. | 361/679.33 |
| 7,697,277 B1 * | 4/2010 | Olesiewicz et al. | 361/679.34 |
| 2003/0052248 A1 * | 3/2003 | Imamura | 248/694 |
| 2004/0240170 A1 * | 12/2004 | Li | 361/685 |
| 2008/0128578 A1 * | 6/2008 | Wu et al. | 248/694 |

* cited by examiner

*Primary Examiner* — Ramon O Ramirez
(74) *Attorney, Agent, or Firm* — Chun-Ming Shih; HDLS IPR Sercices

(57) ABSTRACT

In a fixture for a data access device having a hole, the fixture includes a fixing base, a switch and an elastic member, and the fixing base includes a bottom plate, a pair of bent boards extended out from the bottom plate, and a through groove disposed on bottom plate and corresponding to the hole, a switch disposed on a side of the bottom plate and pivotally coupled to the bent board, and a positioning pillar corresponding to the through groove and protruded from a side of the switch that faces the bottom plate, and the elastic member is elastically clamped between the bottom plate and the switch, such that if the switch is pressed, the positioning pillar will be passed into or retracted from the hole, so as to simply the fixation and installation of the data access device.

6 Claims, 6 Drawing Sheets

FIXTURE FOR DATA ACCESS DEVICE

BACKGROUND OF THE INVENTION

1. Field of the Invention

The present invention generally relates to a fixture, and more particularly to a fixture for a data access device.

2. Description of Prior Art

As computer becomes increasingly popular and extensively used, computer is not just used for computation or data storage for individuals or households only, but is also used for automation and industrial production for enterprises as well. In recent years, the number of files and data is increased drastically, and thus various function including the installation or removal of a data access device such as a hard disk drive, a floppy disk drive and an optical disk drive in a personal computer gradually catch people's attention. In a conventional personal computer architecture, a space for installing several data access devices is available for upgrading and connecting various types of data access devices anytime, and the inventor of the present invention improves the prior art based on the characteristics of installing and detaching the data access devices.

Most of the conventional data access devices are mounted to a computer case at a space reserved at the front of the computer case, such that the data access device can be accommodated in the computer case, and holes are reserved on both sides of the data access device and disposed corresponding to through holes on both sides of the computer case, such that after the data access device is placed into the computer case, a screw element can be passed through the through hole of the computer case and secured to the through hole of the data access device by a tool, so as to fix the data access device to the computer case.

However, the connection of the conventional data access device with the computer case still has the following issues. Since a screw element is used for securing the data access device with the computer case, it is necessary to use a tool (such as a screwdriver) for installing or removing the screw for the installation or removal of the data access device. Such arrangement is inconvenient to users, and sometimes the screw element cannot be loosened, and it causes tremendous trouble to users.

In addition, some manufacturers continue developing various types of fixtures for the data access device and the computer case. Although these fixtures can reduce the installation and removal time, a higher cost is usually incurred and a more complicated or difficult operation is required, and thus the prior art requires improvements.

In view of the foregoing shortcomings of the prior art, the inventor of the present invention based on years of experience in the related industry to conduct extensive researches and experiments, and finally developed a fixture for a data access device in accordance with the present invention to overcome the shortcomings of the prior art.

SUMMARY OF THE INVENTION

It is a primary objective of the invention to provide a fixture for a data access device, wherein a switch is pressed for extending or retracting a positioning pillar with respect to a hole of the data access device to fix or detach the data access device respectively, so as to greatly simplify the fixation and installation of the data access device.

To achieve the foregoing objective, the present invention provides a fixture for a data access device, and the data access device has a hole, and the fixture comprises a fixing base, a switch and an elastic member. The fixing base includes a bottom plate and a pair of bent boards extended from the bottom plate, and the bottom plate includes a through groove corresponding to the hole. The switch is disposed on a side of the bottom plate and pivotally coupled to the bent boards, and the switch includes a positioning pillar protruded from a side facing the bottom plate and corresponding to the through groove. The elastic member is elastically clamped between the bottom plate and the switch.

Another objective of the present invention is to provide a fixture for a data access device, and the fixture can reduce the time of installing the data access device to the computer case and enhance the simplicity of operation and the convenience of use.

DETAILED DESCRIPTION OF THE INVENTION

The technical characteristics, features and advantages of the present invention will become apparent in the following detailed description of preferred embodiments with reference to the accompanying drawings, and the preferred embodiments are used for illustrating the present invention only, but not intended to limit the scope of the invention.

Figure 1:
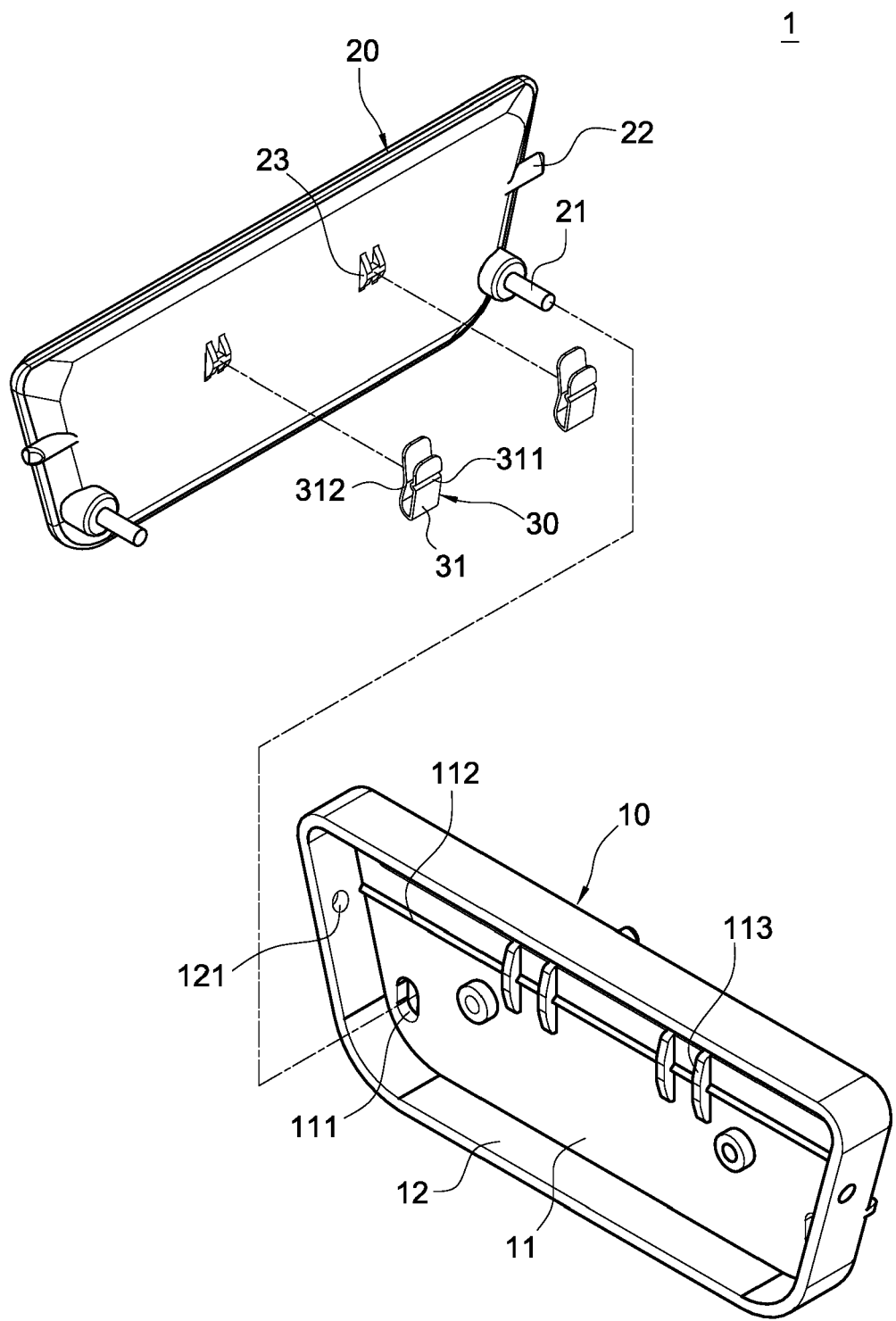
FIG. 1 is an exploded view of a fixture in accordance with the present invention.
Figure 2:
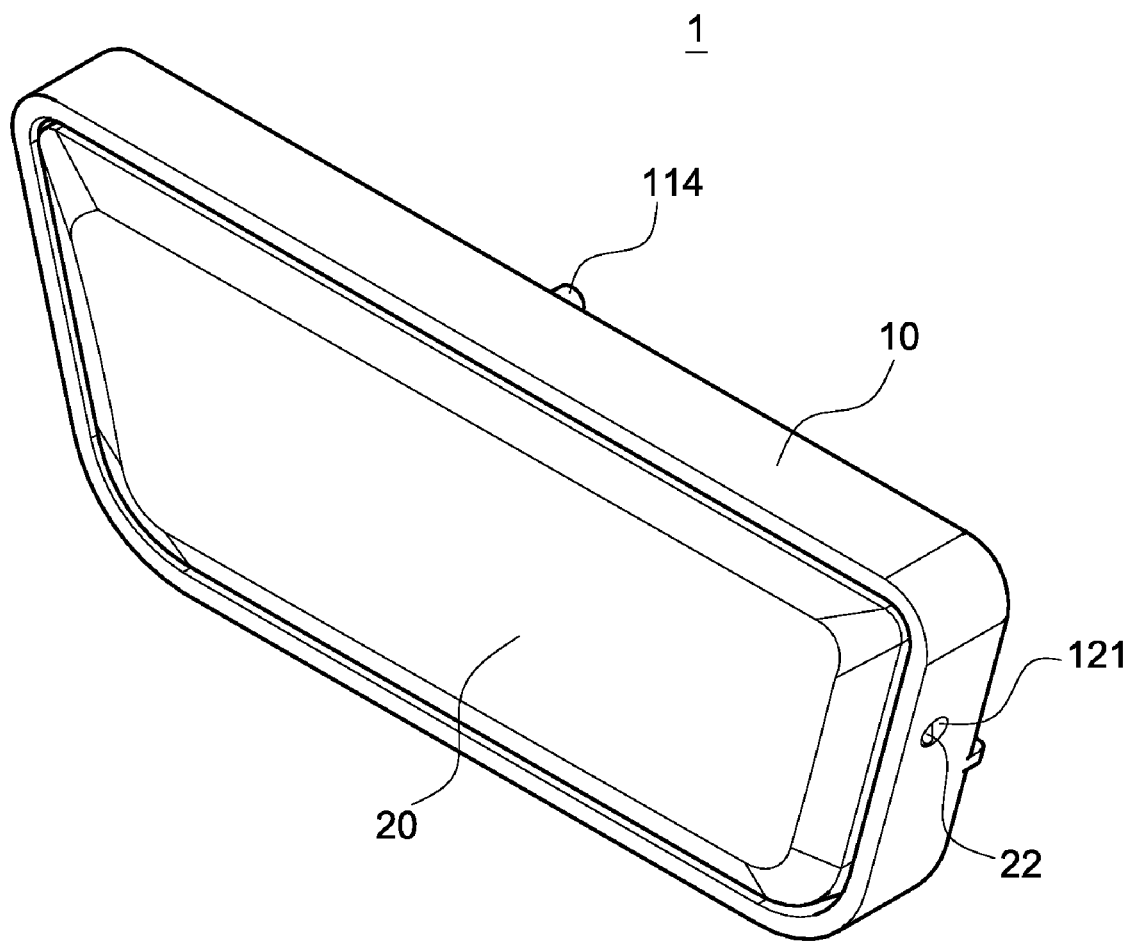
FIG. 2 is a perspective view of a fixture in accordance with the present invention.
Figure 3:
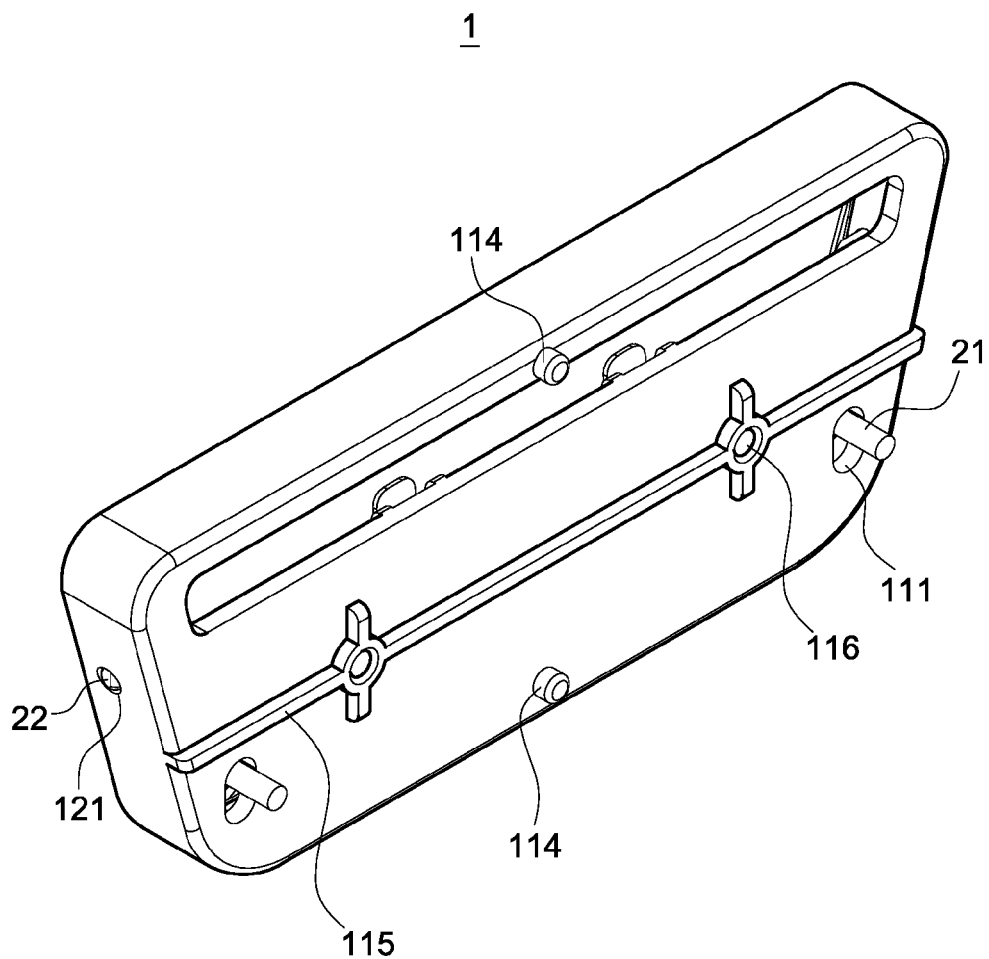
FIG. 3 is another perspective view of a fixture in accordance with the present invention.

With reference to FIGS. 1 to 3 for an exploded view and perspective views of a fixture in accordance with the present invention respectively, the invention provides a fixture for a data access device, and the fixture 1 comprises a fixing base 10, a switch 20 and an elastic member 30.

In a preferred embodiment, the fixing base 10 includes a rectangular bottom plate 11 and two pairs of bent boards 12 formed by and extended from four sides of the perimeter of the bottom plate 11, and the bent boards 12 can be one pair instead of two pairs (not shown in the figure). Two through grooves 111 are formed on the bottom plate 11, but one through groove 111 can be adopted as well. The bottom plate 11 at the top of the two through grooves 111 includes a transversal rib 112 protruded from the bottom plate 11, and the rib 112 includes two sets of clamping plates 113 formed thereon, but one of the clamping plates 113 can be used as well. A pivotal hole 121 is disposed at a position corresponding to each of the left and right sides of the bent board 12. In addition, the backside of the bottom plate 11 includes a plurality of embedding pillars 114 and a transversal joint strip 115 (as shown in FIG. 3), and the joint strip 115 includes a locking hole 116 disposed thereon.

The switch 20 is substantially in a rectangular shape and contained in each bent board 12 of the fixing base 10, and the switch 20 includes a positioning pillar 21 protruded from a side facing the bottom plate 11 and corresponding to the through groove 111. Further, a pivotal shaft 22 is protruded from the top of the positioning pillar 21 and corresponding to the pivotal hole 121, and the pivotal shaft 22 is pivotally coupled to the pivotal hole 121 of each bent board 12, and the switch 20 includes a pressing bar 23 protruded from a plane facing the bottom plate 11 and corresponding to the clamping plate 113.

In this embodiment, the elastic member 30 is an elastic plate made of a metal, but the invention is not limited to such arrangement only, and the elastic plate is substantially in a U-shape, and a trench 311 of the joint strip 115 is formed on an external side of each of the two vertical plates 31 and corresponding to the indent 312 of the pressing bar 23. The elastic member 30 is elastically clamped between the bottom plate 11 and the switch 20, and one of the vertical plates 31 is clamped by the clamping plate 113 and limited into a position longitudinally by the joint strip 115, and the other vertical plate 31 is elastically pressed by the pressing bar.

Figure 4:
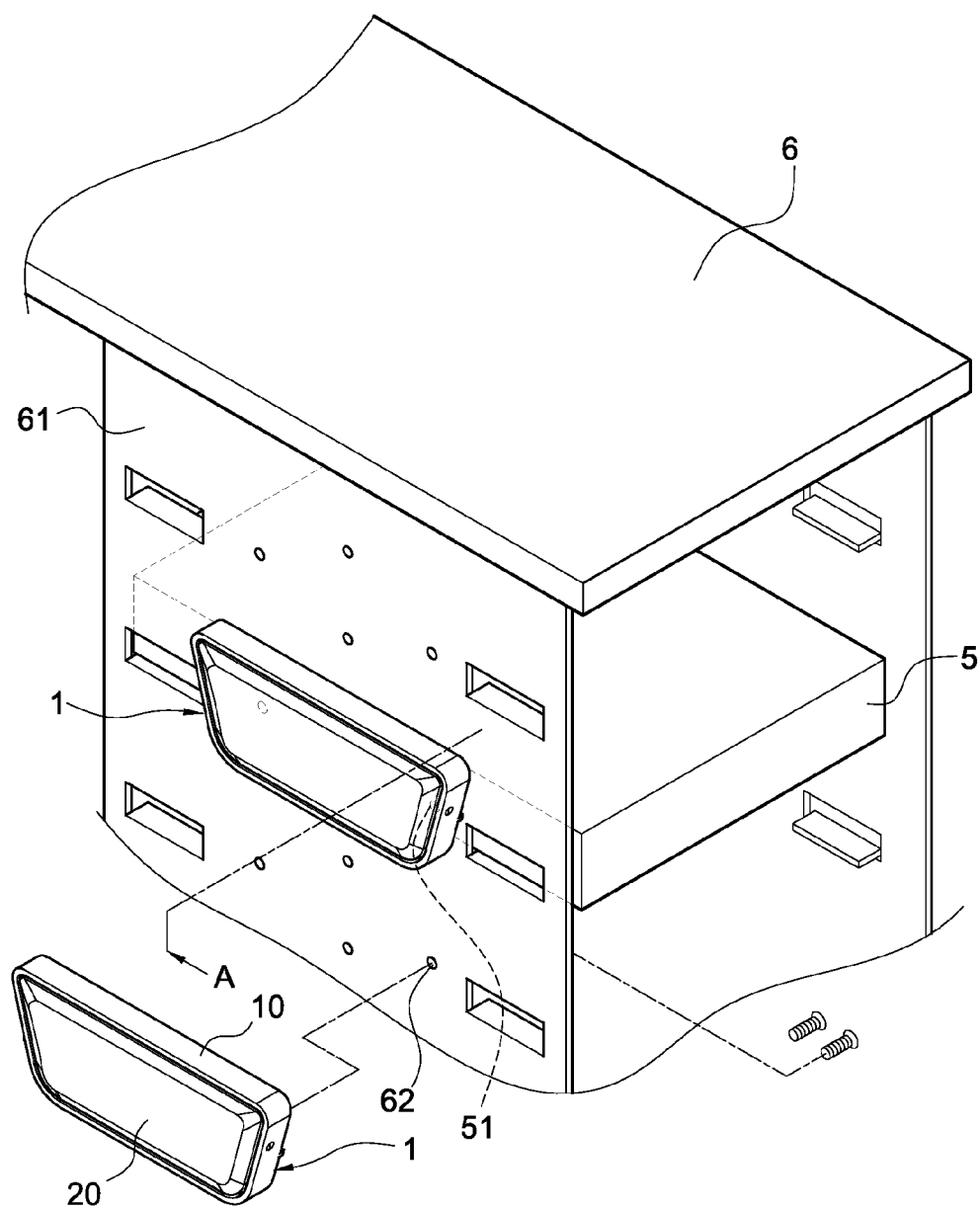
FIG. 4 is a schematic view of applying a fixture onto a data access device in accordance with the present invention.

With reference to FIG. 4 for a perspective view of a fixture applied to a data access device in accordance with the present invention, the fixture 1 is applied to the data access device 5 such as a floppy disk drive, an optical disk drive or a hard disk drive. The data access device 5 of this embodiment is an optical disk drive having a hole 51 disposed on a side of the optical disk drive, and the data access device 5 is installed on the computer case 6, and the computer case 6 includes a frame panel 61. When assembled, a vertical plate 31 of the elastic member 30 is clamped between two clamping plates 113 (as shown in FIG. 1), and then two pivotal shafts 22 of the switch 20 are passed through a corresponding pivotal hole 121 of the bent board 12, so that the elastic member 30 is elastically clamped between the bottom plate 11 and the pressing bar 23 while the positioning pillar 21 is installed precisely into the through groove 111, and the embedding pillar 114 and the joint strip 115 of the fixing base 10 (not shown in the figure) are positioned at corresponding positions of the frame panel 61, and a screw element such as a screw is passed from the interior of the frame panel 61 into the hole 51 and secured with the locking hole 116.

Figure 5:
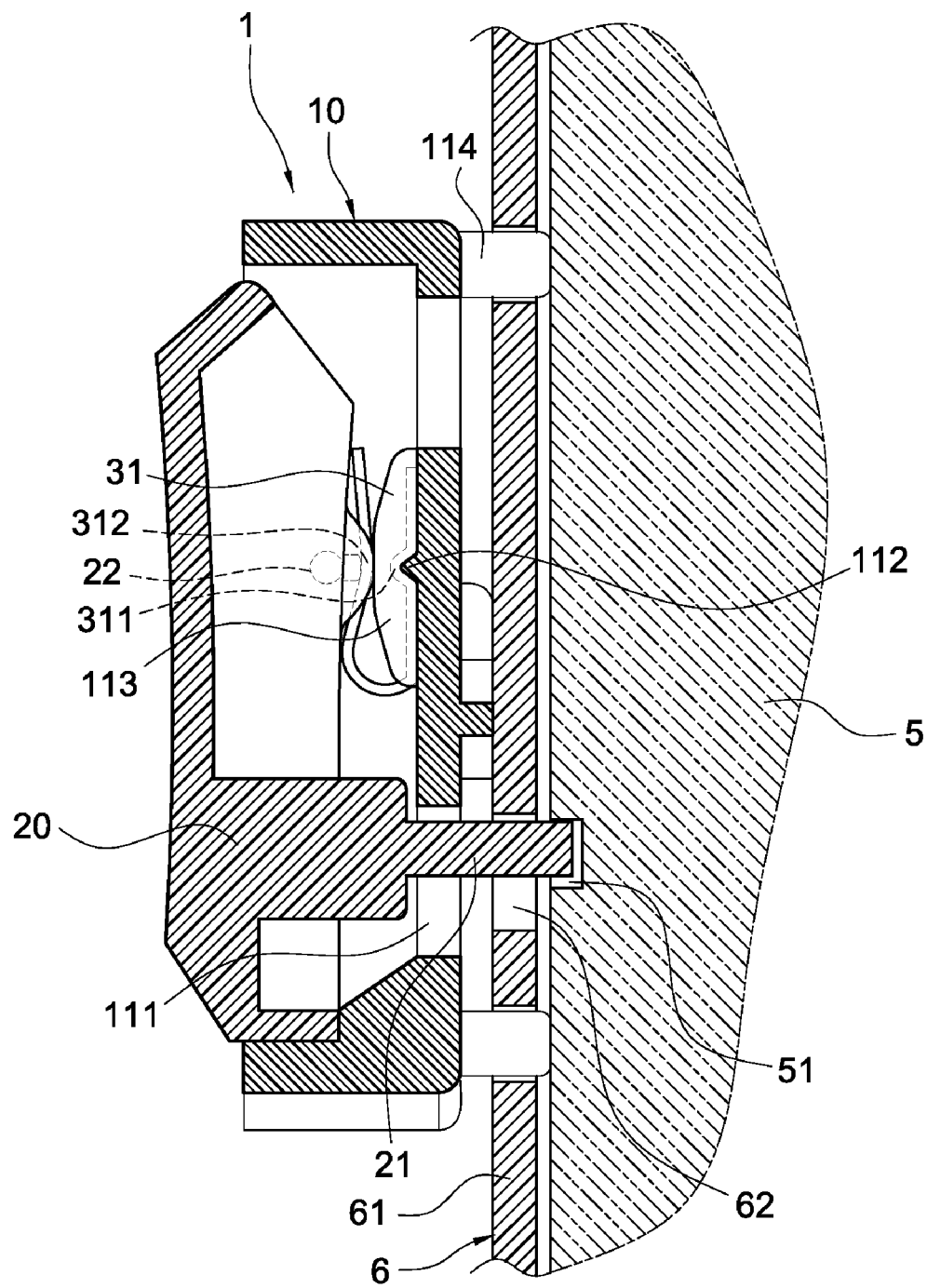
FIG. 5 is a cross-section view of a Section 5-5 of FIG. 4.
Figure 6:
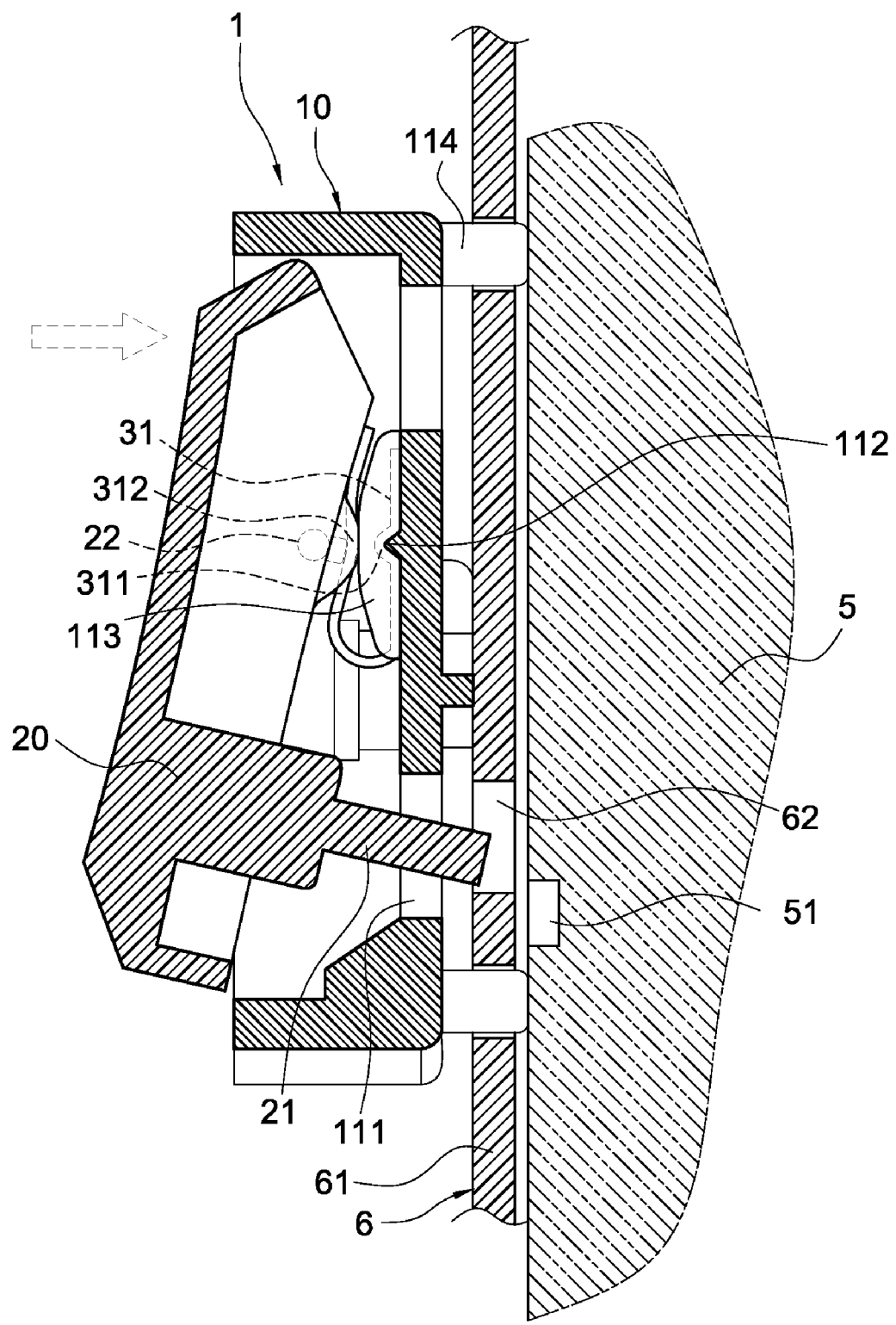
FIG. 6 is a schematic view of pressing a switch of a fixture in accordance with the present invention.

With reference to FIGS. 5 and 6 for a cross-sectional view of Section 5-5 of FIG. 4 and a schematic view of a switch being pressed in accordance with the present invention respectively, if it is necessary to remove the data access device 5, the top of the switch 20 is pressed to turn the data access device 5 with the pivotal shaft 22 as the center of rotation, so that the positioning pillar 21 can be retracted from the hole 51 by the turning movement, and the data access device 5 can be pulled out from the front of the computer case 6 (as shown in FIG. 6). On the other hand, if it is necessary to install the data access device 5, the top of the switch 20 is pressed to turn with the pivotal shaft 22 as the center of rotation, such that the positioning pillar 21 is withdrawn. After the data access device 5 is pushed from the front of the computer case 6 into the computer case 6, the switch 20 is released. With the resilient force of the elastic member 30, the positioning pillar 21 is turned into the hole 51 of the data access device 5 for fixing the data access device 5 (as shown in FIG. 5).

In summation of the description above, the present invention improves over the prior art and complies with the patent application requirements and thus is duly filed for patent application While the invention is described in by way of examples and in terms of preferred embodiments, it is to be understood that the invention is not limited thereto. On the contrary, the aim is to cover all modifications, alternatives and equivalents falling within the spirit and scope of the invention as defined by the appended claims.

What is claimed is:

1. A fixture for a data access device having a hole, and the fixture comprising:
    a fixing base, including a bottom plate, a pair of bent boards extended from the bottom plate, and a through groove disposed on the bottom plate and corresponding to the hole;
    a switch, disposed on a side of the bottom plate, and pivotally coupled to the bent boards, and the switch having a positioning pillar protruded from a side facing the bottom plate, and corresponding to the through groove; and
    an elastic member, elastically clamped between the bottom plate and the switch;
    such that the switch is pressed for passing or retracting the positioning pillar into or from the hole.

2. The fixture for a data access device of claim 1, wherein each bent boards include a pivotal hole, and the switch includes a pivotal shaft protruded thereon and corresponding to the pivotal hole, and the pivotal shaft is pivotally coupled to the pivotal hole.

3. The fixture for a data access device of claim 1, wherein the bottom plate includes a set of clamping plates protruded thereon, and the elastic member is a U-shaped elastic plate having two vertical plates, and one of the vertical plates is clamped by the clamping plates.

4. The fixture for a data access device of claim 1, wherein the bottom plate at the top of the through groove includes a rib protruded from the bottom plate, and the rib includes a clamping plate formed thereon, and the elastic member is a U-shaped elastic plate having two vertical plates, and one of the vertical plates includes a trench formed on an external side of the vertical plate, and the vertical plate having the trench is clamped by the clamping plates, and the rib is embedded into the trench and limited into a position.

5. The fixture for a data access device of claim 4, wherein the other vertical plate includes an indent formed on an external side of the other vertical plate, and the switch includes a pressing bar protruded thereon and corresponding to the clamping plates, and the pressing bar is elastically pressed corresponding to the indent.

6. The fixture for a data access device of claim 1, wherein the elastic member is an elastic plate made of a metal.

* * * * *